United States Patent
James

(10) Patent No.: US 7,213,192 B2
(45) Date of Patent: May 1, 2007

(54) METHODS AND APPARATUS FOR CORRECTING ERRORS IN DATA READ FROM A DISK DRIVE

(75) Inventor: Michael James, Longmont, CO (US)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 10/936,069

(22) Filed: Sep. 8, 2004

(65) Prior Publication Data

US 2006/0053360 A1    Mar. 9, 2006

(51) Int. Cl.
G11B 20/18    (2006.01)

(52) U.S. Cl. .................................. 714/769
(58) Field of Classification Search ............ 714/769
See application file for complete search history.

(56) References Cited

U.S. PATENT DOCUMENTS

| | | | | |
|---|---|---|---|---|
| 5,778,009 A * | 7/1998 | Fredrickson et al. | ...... | 714/752 |
| 5,812,564 A * | 9/1998 | Bonke et al. | ...... | 714/769 |
| 5,844,919 A * | 12/1998 | Glover et al. | ...... | 714/769 |
| 5,914,967 A * | 6/1999 | Yomtoubian | ...... | 714/718 |
| 5,974,582 A * | 10/1999 | Ly | ...... | 714/781 |
| 6,061,824 A * | 5/2000 | Mo et al. | ...... | 714/769 |
| 6,247,152 B1 * | 6/2001 | Russell | ...... | 714/718 |
| 6,321,351 B1 * | 11/2001 | Brown et al. | ...... | 714/704 |
| 6,327,106 B1 * | 12/2001 | Rothberg | ...... | 360/53 |
| 6,363,511 B1 * | 3/2002 | Massoudi | ...... | 714/755 |
| 6,961,877 B2 * | 11/2005 | Si et al. | ...... | 714/49 |
| 6,981,205 B2 * | 12/2005 | Fukushima et al. | ...... | 714/797 |
| 2003/0163759 A1 * | 8/2003 | Arakawa | ...... | 714/8 |
| 2003/0177434 A1 * | 9/2003 | Su et al. | ...... | 714/768 |
| 2004/0199718 A1 * | 10/2004 | Byers et al. | ...... | 711/112 |
| 2005/0076285 A1 * | 4/2005 | Silvus et al. | ...... | 714/755 |

* cited by examiner

*Primary Examiner*—Stephen M. Baker
(74) *Attorney, Agent, or Firm*—Greer, Burns & Crain, Ltd.

(57) ABSTRACT

Data requested from a disk drive by a host is read continuously from sectors in tracks on a rotating disk and is temporarily stored in buffer memory within the disk drive. Before releasing the sectors for host access, each sector is checked for errors, and if errors are identified, error correction is attempted in a correction engine, using a selected error correction facility. If the errors are not corrected using the first selected correction facility, the bad sector is held in the buffer memory until the correction engine is idle. The correction engine is idle, for example, when good sectors (which have no errors) are read and are immediately released for host access. This idle time in the correction engine is used to attempt error correction using one or more different correction facilities. If the errors are corrected using the correction engine's idle time, it is not necessary to re-read the sector.

8 Claims, 5 Drawing Sheets

METHODS AND APPARATUS FOR CORRECTING ERRORS IN DATA READ FROM A DISK DRIVE

This invention relates to methods and apparatus for correcting errors in data read from memory device such as a disk drive, and more particularly, to error correction methods and apparatus that use idle time in an error correction engine to reduce the time required for error correction.

BACKGROUND OF THE INVENTION

In a conventional disk drive, data is written to and read from a rotating magnetic medium (disk) by a write head and a read head mounted on a head slider. The disk drive writes and reads data in response to commands from a host, such as a personal computer.

In a disk drive, data is written to the disk on concentric tracks, in sectors defined within the tracks. When the disk drive receives a request for data from its host, the disk drive moves the read head to the first track having requested data, reads the relevant sector or sectors from the disk, and repeats that process until all of the requested data has been retrieved.

As the data is read, it is temporarily stored in an internal memory in the disk drive, while it is checked for errors. In the absence of errors, the data is released for access by the host. If errors are detected in a sector, though, an error correction engine attempts to correct them, using one or more algorithms. If the errors in the bad sector are not corrected, the data is typically re-read from the disk, which requires an additional rotation of the disk over the bad sector. This is inefficient, and increases the time required to correct the errors and release the data for host access. Thus, there is a need for methods and apparatus for correcting such data errors which are more efficient, and reduce or eliminate the need for re-reading data from the disk during the error correction process.

Accordingly, one object of this invention is to provide new and improved methods and apparatus for correcting errors in data read from a disk drive.

Another object is to provide new and improved error correction methods and apparatus that reduce the time required for error correction.

SUMMARY OF THE INVENTION

In keeping with one aspect of this invention, data requested from a disk drive by a host is read from sectors in tracks on a rotating disk and is temporarily stored in buffer memory within the disk drive. Before releasing the sectors for host access, each sector is checked for errors, and if errors are detected, error correction is attempted in a correction engine, using a selected error correction facility. If the errors in the bad sector are corrected using the first selected correction facility, the bad sector is corrected in the buffer memory. The sector is then released for host access.

If the errors are not corrected using the first selected correction facility, the bad sector is held in the buffer memory until the correction engine is idle. The correction engine is idle, for example, when good sectors (which have no errors) are read and are immediately released for host access. This idle time in the correction engine is used to attempt error correction using one or more different correction facilities. If the errors are corrected using the correction engine's idle time, it is not necessary to re-read the sector.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
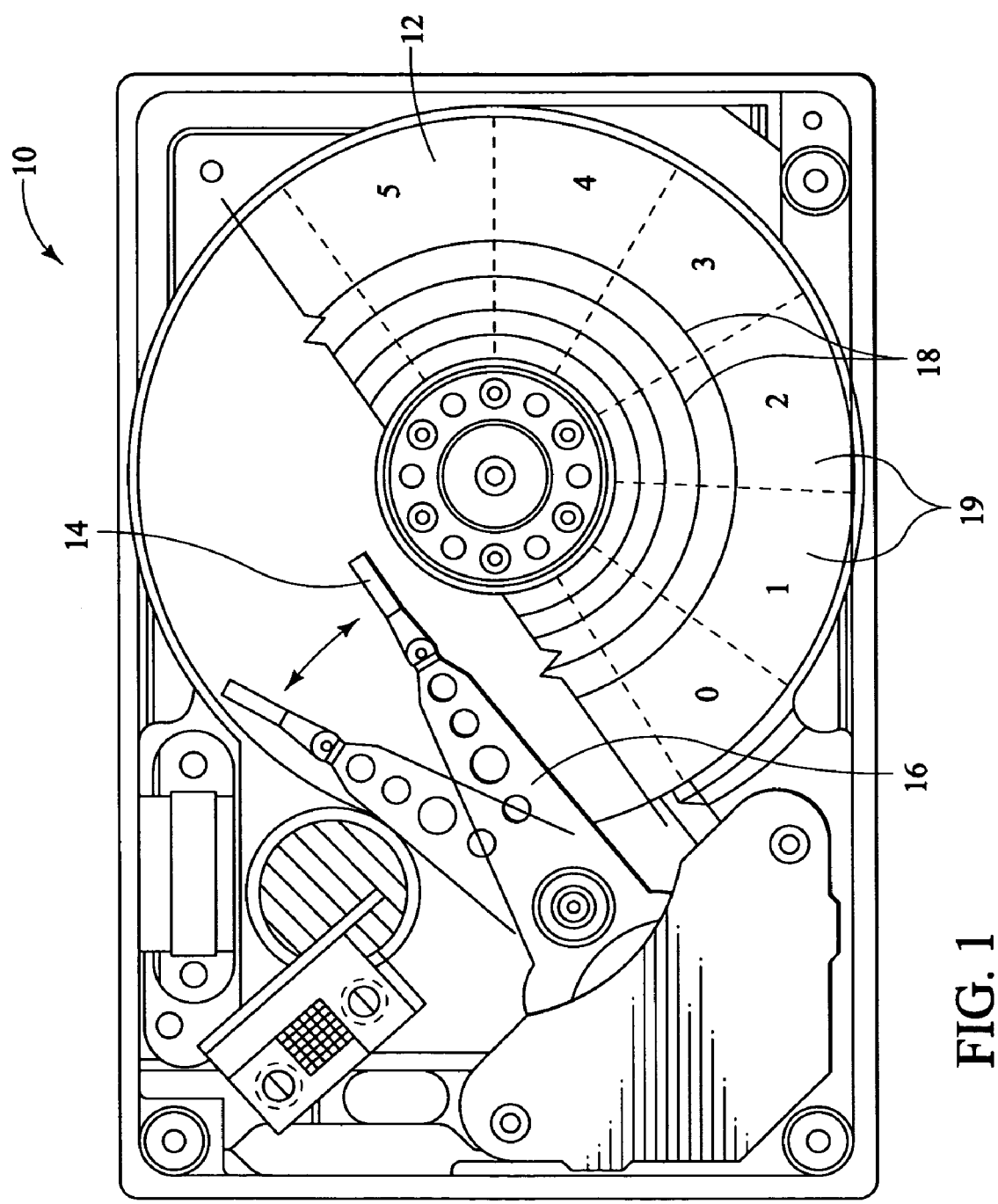
FIG. 1 is a plan view of a disk drive made in accordance with the present invention.

As seen in FIG. 1, a disk drive 10 includes a rotatable memory medium disk 12, and a head slider 14 that includes a read/write head or separate read and write heads (not shown) on the head slider. As the disk rotates, the slider 14 is moved across the disk by an actuator 16.

The disk 12 has a plurality of concentric tracks 18, each of which is divided into a plurality of consecutive sectors 19. The memory medium could also be a disk that has a single track arranged in a spiral fashion, such as a CD-ROM, or a tape that might have a single track. In any event, each sector 19 includes a predetermined amount of information data, among other things.

The disk drive 10 writes information to the disk and reads information from the sectors in the disk, in a sector-by-sector fashion. The data is written to the disk in an encoded form, with predetermined formatting. When a host device 20, shown in FIG. 2, such as a personal computer, issues a write command, data is sent from the host to a host interface 22, and a buffer manager 24 temporarily stores the data in memory such as an SDRAM 26. The data is formatted in a formatter 28, which encodes the data with information that can be used to detect, identify and correct errors when the data is later read from the disk.

The head is placed over a desired track through an actuator control device (not shown), and writing begins when the write head is over the selected sectors. The writing operation is controlled by an internal control unit 34. While not shown in FIG. 1, the control unit 34 interfaces with virtually all of the components of the disk drive. A typical control unit would be implemented with a central processing unit or processor, a state machine or the like.

When the host 20 issues a read command, the control unit 34 identifies the sectors that have the requested data. The read head is moved to the desired track and sector, and reads the selected sectors on that track, generally sequentially. The data passes through a preamp 36, a read channel 38 and the formatter 28 to both the buffer manager 24 and an error correction code (ECC) unit 40. The buffer manager 24 stores the sector data in SDRAM 26 or some other temporary storage facility.

Figure 3:
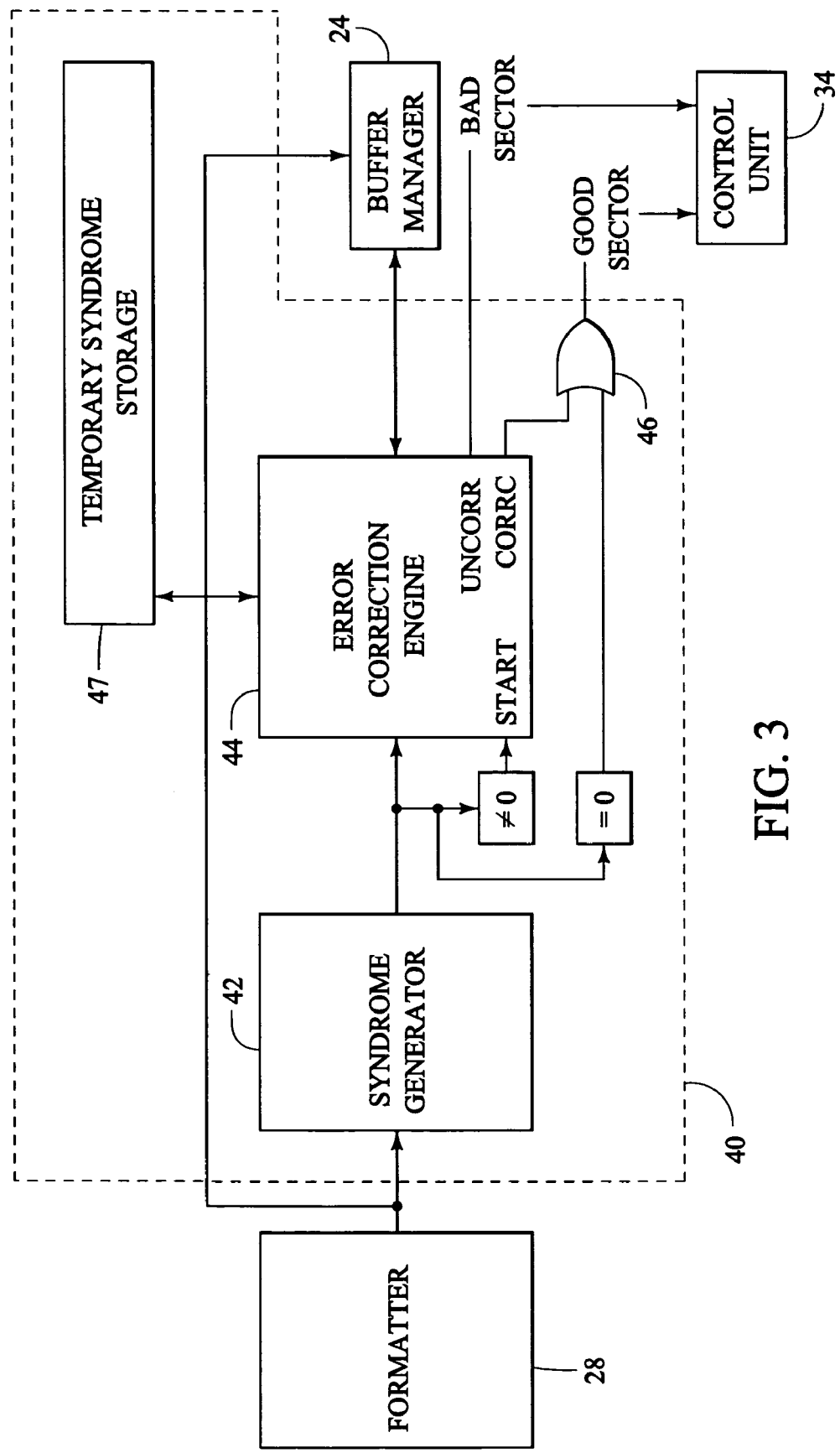
FIG. 3 is a block diagram of the error correction unit used in the disk drive of FIG. 1.

The ECC unit 40 is shown in more detail in FIG. 3. The ECC unit 40 includes a syndrome generator 42 and an error correction engine 44. The correction engine 44 can be software, firmware, and/or hardware, programmed to run multiple algorithms and use various techniques to identify errors in the data. The engine 44 can then directly or indirectly correct the errors in buffer memory 26. The syndrome generator 42 executes an algorithm on data one sector at a time, to determine whether or not errors exist in each sector. If no errors exist, a typical syndrome will be all "0" or some other fixed result. In that event, the "all 0" result is sent to an OR gate 46, and a "good sector" signal is sent to the control unit 34.

If the syndrome generator 42 obtains a result that is not "all 0", indicating that the sector contains errors, the syndrome is stored in a temporary syndrome storage memory 47, and the syndrome is sent to the error correction engine 44. The engine 44 executes a selected algorithm in an effort to identify the errors. If the correction engine 44 is able to identify the errors within a certain time, the correction engine 44 interfaces with the buffer manager 24 to correct the errors and produces an output CORRC to the OR gate 46, which produces a "good sector" signal for the control unit. If the error cannot be corrected, the correction engine 44 sends a UNCORR output to the control unit 34, indicating that a "bad sector" exists.

Figure 2:
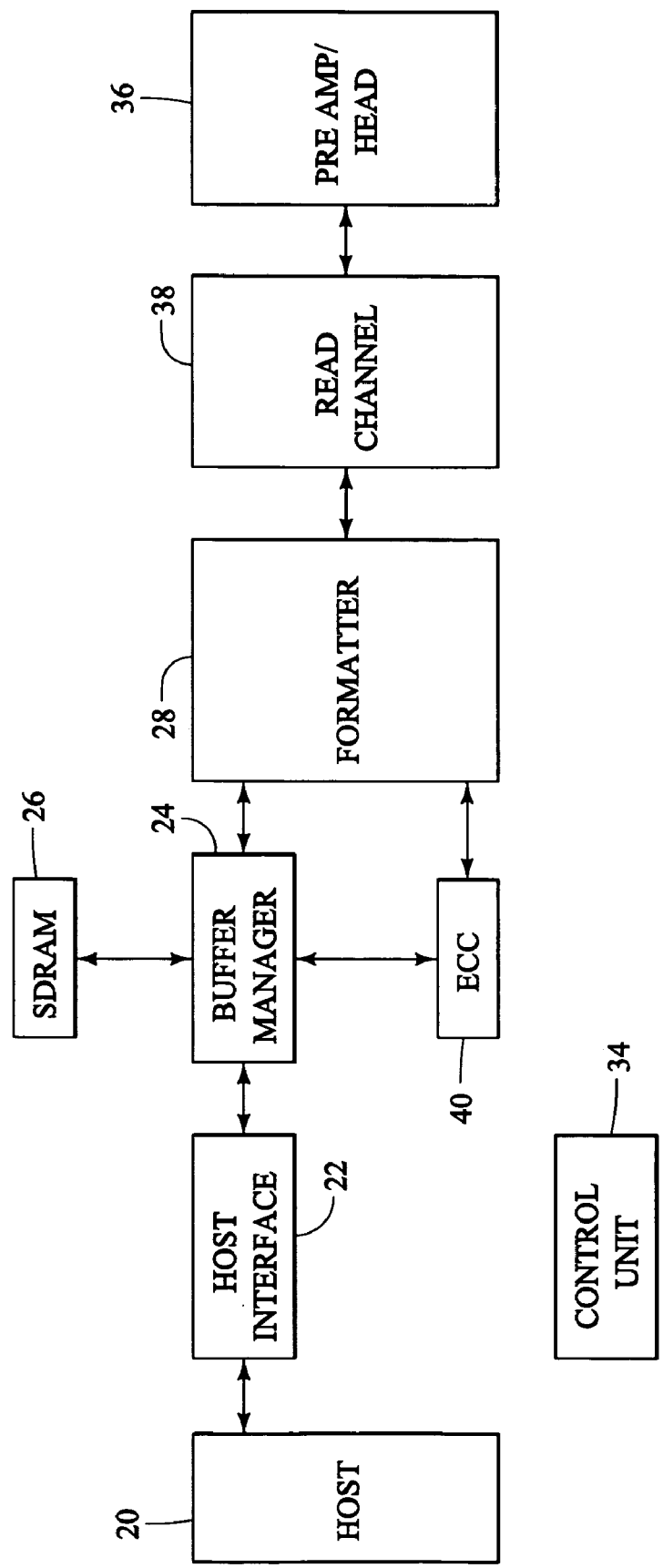
FIG. 2 is a block diagram of various components and interfaces used in the disk drive of FIG. 1.

As seen in FIG. 2, the sectors are sent to the buffer manager 24 as they are sent through the ECC unit 40. The buffer manager stores the read data in the SD-RAM 26 until the control unit releases the data to host access from the buffer memory 26. If the sectors are good, the data can be released immediately. If bad sectors are found, they cannot be released until the errors are corrected.

Figure 4:
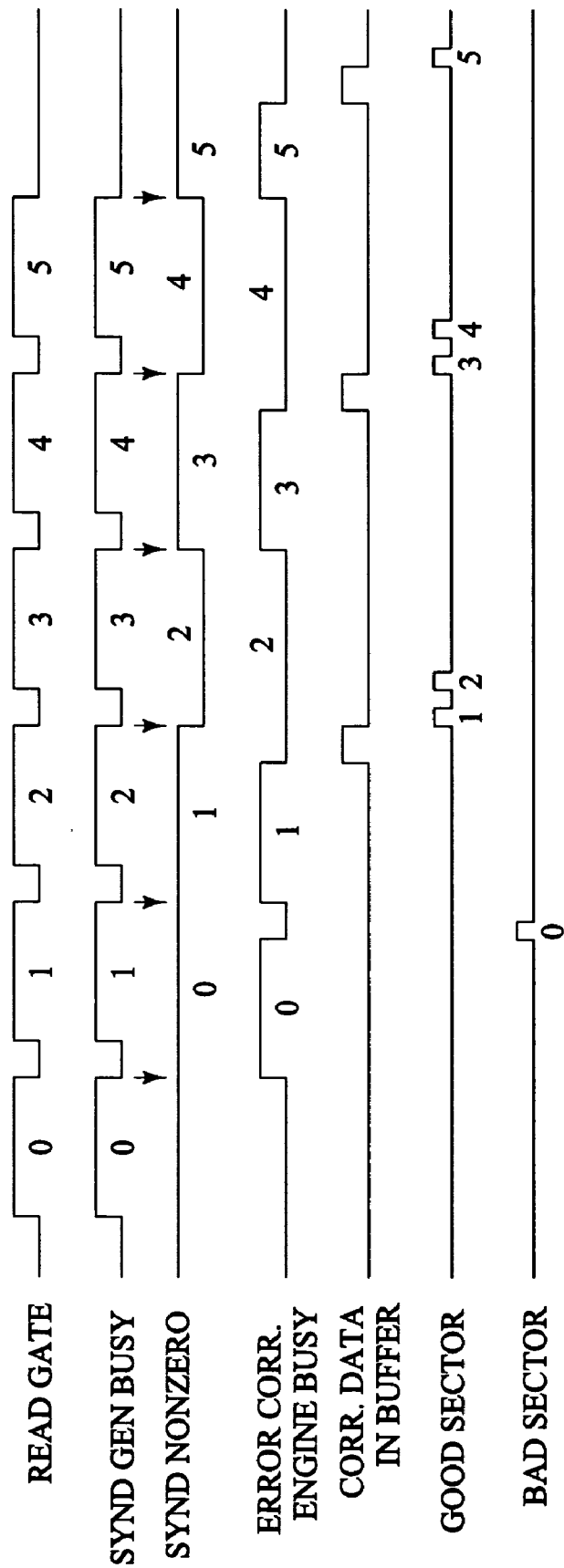
FIG. 4 is a timing chart illustrating the overall operation of the error correction unit according to the present invention.

The manner in which the requested sectors are read from the disk is illustrated in the timing chart of FIG. 4. The read gate opens for sectors 0, 1, 2, 3, 4 and 5, in a continuous, sequential manner. The syndrome generator 42 is busy with the sectors at essentially the same time that the read gate is open. However, the result or output of the syndrome generator is produced after each sector is read, so the syndrome generator output lags the read gate by about the time that it takes to read one sector.

The syndrome non-zero signal in FIG. 4 indicates that sector 0, sector 1, sector 3 and sector 5 contain errors, and sector 2 and sector 4 are good sectors. The error correction engine is busy when it corrects sectors 0 and 1, but is idle after sectors 2 and 4 are checked, because those sectors have no errors. The engine is also busy after sectors 3 and 5 are checked, because those errors must be corrected, as well.

FIG. 4 indicates that sector 0 could not be corrected immediately by the error correction engine, so a bad sector pulse for sector 0 was produced. FIG. 4 also indicates that good sector pulses were produced for sector 1, indicating that its error or errors were corrected immediately. A good sector pulse was generated immediately for sector 2 because sector 2 had no errors. Similarly, a good sector pulse was produced for sector 3 after its errors were immediately corrected, and a good sector pulse for sector 4 was produced soon afterwards, because sector 4 contained no errors. The errors in sector 5 were corrected, which produced a good sector pulse for sector 5.

In conventional disk drives, the bad sector 0 would be re-read from the disk, adding time to the read process. With the present invention, though, idle time of the correction engine is utilized to try to fix sector 0, without re-reading the bad sector from the disk. In the example of FIG. 4, the correction engine is idle in the time allocated for sectors 2 and 4.

Figure 5:
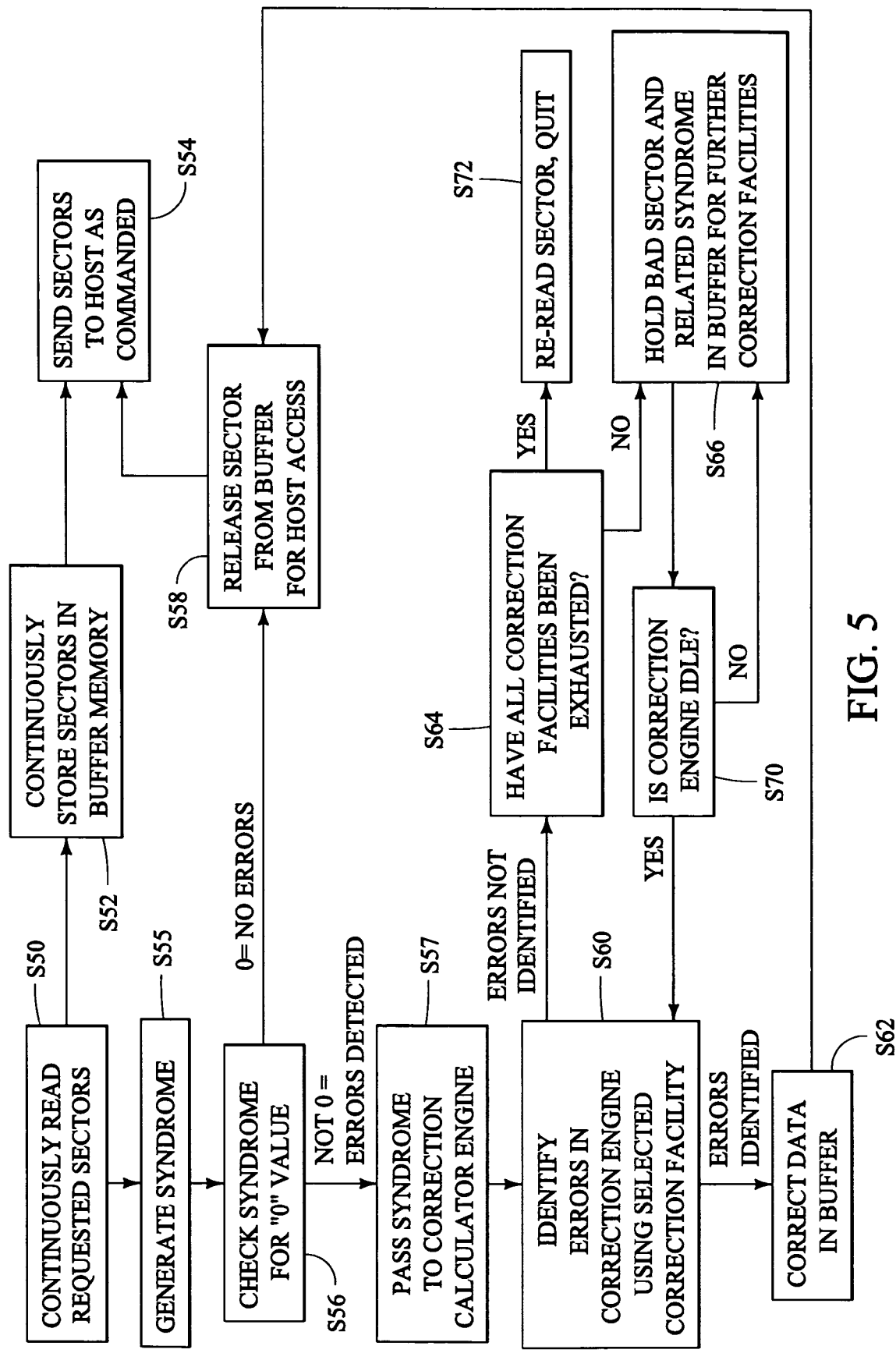
FIG. 5 is a flowchart showing the manner in which errors are corrected using the present invention.

The manner in which the correction engine idle time is used is illustrated in FIG. 5. Requested sectors are continuously read at step S50, and are continuously stored in buffer memory in step S52. In step S54, sectors which have been released for host access are sent to the host as commanded.

As sectors are read and stored in the buffer memory, a syndrome is generated at step S55, and the results are checked in step S56. If no errors are found in a sector (i.e., the syndrome result is all 0), the sector is released for host access from the buffer memory in step S58.

If errors are detected at step S56 (i.e., the syndrome result is not all 0), the syndromes are passed to the correction engine 44 at step S57, and the correction engine 44 attempts to identify the errors in the bad sector using a selected correction facility. If the errors are identified using the first selected correction facility, the bad sector is corrected in the buffer memory 26 in step S62. The corrected sector is then released for host access from the buffer in step S58.

If the errors are not corrected in the correction engine 44 using the first selected correction facility, the control unit 34 determines whether all correction facilities have been exhausted, in step S64. If not, the bad sector is held in the buffer memory 26 and the syndrome is held in temporary syndrome storage 47 (step S66) until the correction engine has idle time. When idle time is detected at step S70, the error correction engine 44 attempts error correction again, using a different selected correction facility. The control unit continues to loop the correction engine through various correction facilities until the errors are corrected or all the correction facilities have been exhausted. If all correction facilities have been exhausted and the errors are not corrected, the sector is re-read or the controller indicates that the read attempt has failed, at step S72. In this manner, idle time of the correction engine is utilized to avoid re-reading a bad sector from the disk, until all correction facilities have been exhausted.

With this invention, errors in sector data can be corrected more often without re-reading the sectors, eliminating an extra rotation of the disk. This is more efficient than conventional systems, and decreases the response time of the disk drive.

While the principles of the invention have been described above in connection with specific apparatus and applications, it is to be understood that this description is made only by way of example and not as a limitation on the scope of the invention.

What is claimed is:

1. A method for correcting errors in data read from a memory medium for access by a host, the data being stored on at least one track having a plurality of sectors, comprising the steps of:
   reading selected sectors from the memory medium,
   storing the selected sectors in a buffer memory,
   checking each sector for errors and releasing sectors having no errors for host access,
   if errors are detected, attempting error correction using a selected correction facility in an error correction engine, and
   if the errors are identified, correcting the data in the buffer memory, and releasing the sector for host access, and
   if the errors in the bad sector are not identified, holding the bad sector in the buffer memory and attempting error correction using a different selected correction facility when the error correction engine is idle.

2. The method of claim 1, wherein the sectors are checked for errors by generating a syndrome.

3. The method of claim 2, wherein the results of syndrome generation are a fixed number, a first fixed number indicating no errors, and some other fixed number indicating that errors have been detected.

4. The method of claim 2, wherein the results of syndrome generation are used to correct the errors.

5. Apparatus for recording information to a memory medium and reproducing the information from the memory medium for access by a host, the memory medium having the information stored on at least one track having a plurality of sectors comprising:
- means for recording the information on the memory medium;
- means for reading the information from the memory medium;
- a buffer memory that temporarily stores information read from the selected sectors, and
- an error correction unit that sequentially checks each sector for errors and releases sectors having no errors for host access,
- if errors are detected, the error correction unit attempting correction using a selected correction facility in an error correction engine,
- if the errors are corrected, the error correction engine correcting the data in the memory buffer and releasing the sector for host access, and
- if the errors in the bad sector are not corrected, the correction engine holding the bad sector in the buffer memory and attempting error correction using a different selected correction facility when the error correction engine is idle.

6. The apparatus of claim 5 wherein the apparatus is a disk drive.

7. The apparatus of claim 5, wherein the error correction unit further includes a syndrome generator,
- the syndrome generator sequentially checking each sector for errors and producing a syndrome result,
- the error correction engine using the syndrome to identify and correct the errors.

8. The apparatus of claim 7, wherein the syndrome generator generates a first fixed value if no errors are detected in a selected sector, and generates a second fixed value if errors are detected.

* * * * *